(12) United States Patent
Guichard et al.

(10) Patent No.: US 7,584,069 B2
(45) Date of Patent: Sep. 1, 2009

(54) DEVICE AND METHOD FOR CORRECTING THE AGING EFFECTS OF A MEASUREMENT SENSOR

(75) Inventors: Philippe Guichard, Chabeuil (FR); Pierre-Olivier Lefort, Valence (FR); Jerome Willemin, Tullins (FR)

(73) Assignee: Thales (FR)

( * ) Notice: Subject to any disclaimer, the term of this patent is extended or adjusted under 35 U.S.C. 154(b) by 0 days.

(21) Appl. No.: 12/089,471

(22) PCT Filed: Oct. 3, 2006

(86) PCT No.: PCT/EP2006/066998

§ 371 (c)(1),
(2), (4) Date: Apr. 7, 2008

(87) PCT Pub. No.: WO2007/042427

PCT Pub. Date: Apr. 19, 2007

(65) Prior Publication Data

US 2008/0228421 A1     Sep. 18, 2008

(30) Foreign Application Priority Data

Oct. 14, 2005    (FR) ................................. 05 10514

(51) Int. Cl.
*G01C 19/00*   (2006.01)
*G01C 21/00*   (2006.01)
*G01C 25/00*   (2006.01)

(52) U.S. Cl. ........................ 702/104; 701/213; 73/1.78

(58) Field of Classification Search ................. 702/104, 702/57, 79, 81, 84, 85, 89, 94–97, 107, 127, 702/141, 142, 144, 145, 150–153, 182; 701/3, 701/7, 207, 213, 214, 220, 221; 714/731, 714/744; 73/1.37, 1.38, 1.75–1.79
See application file for complete search history.

(56) References Cited

U.S. PATENT DOCUMENTS 5,512,903 A * 4/1996 Schmidtke ............. 342/357.14

(Continued)

FOREIGN PATENT DOCUMENTS

FR           2 830 320         4/2003

OTHER PUBLICATIONS

Braden et al., Integrated Inertial Navigation System/Global Positioning System (INS/GPS) for Manned Return Vehicle Autoland Application, 1990 IEEE, pp. 74-82.*

(Continued)

*Primary Examiner*—Michael P. Nghiem
*Assistant Examiner*—Toan M Le
(74) *Attorney, Agent, or Firm*—Lowe Hauptman Ham & Berner, LLP

(57) ABSTRACT

The invention relates to a method of correcting the effects of aging of a measurement sensor upon turning on the sensor. It also relates to a device delivering measurements corrected for the effects of aging of the device. According to the invention, the method of correcting the effects of aging of a sensor starts by on turning on the processing unit. The absolute time information is transmitted from a satellite positioning receiver to a processing unit. The age of the sensor is determined by comparison of the date of manufacture of the sensor and the absolute time information. Corrections to be made to a sensor measurement, based on the age of the sensor and on the degradation law, are determined. The corrections are applied to the sensor measurement.

20 Claims, 3 Drawing Sheets

U.S. PATENT DOCUMENTS

| | | | | |
|---|---|---|---|---|
| 5,623,414 | A | * | 4/1997 | Misra .......................... 701/207 |
| 5,923,286 | A | * | 7/1999 | Divakaruni ............ 342/357.06 |
| 5,931,889 | A | * | 8/1999 | Misra .......................... 701/213 |
| 5,982,669 | A | * | 11/1999 | Kalnitsky et al. ...... 365/185.28 |
| 6,292,750 | B1 | * | 9/2001 | Lin ............................. 701/214 |
| 6,313,786 | B1 | * | 11/2001 | Sheynblat et al. ...... 342/357.02 |
| 7,409,289 | B2 | * | 8/2008 | Coatantiec et al. .......... 701/214 |
| 2002/0120400 | A1 | | 8/2002 | Lin |

OTHER PUBLICATIONS

Miloshevich L.M. et al. "Impact of Vaisala Radiosonde Humidity Corrections on ARM IOP Data", Twelfth Arm Science Team Meeting Proceedings [Online], Apr. 12, 2002, XP002384675, St. Petersburg, Florida, URL:http://www.arm.gov/publications/proceedings/conf12/extended_abs/miloshevich-1m.pdf> [extrait le 22006-06-08], p. 2, line 28, p. 4, line 8-16.

* cited by examiner

DEVICE AND METHOD FOR CORRECTING THE AGING EFFECTS OF A MEASUREMENT SENSOR

CROSS-REFERENCE TO RELATED APPLICATIONS

The present Application is based on International Application No. PCT/EP2006/066998, filed on Oct. 3, 2006, which in turn corresponds to French Application No. 05 10514, filed on Oct. 24, 2005, and priority is hereby claimed under 35 USC §119 based on these applications. Each of these applications are hereby incorporated by reference in their entirety into the present application.

FIELD OF THE INVENTION

The invention relates to a method of correcting the effects of aging of a measurement sensor. It also relates to a device delivering measurements corrected for the effects of the aging of the device.

The invention is particularly useful in the field of navigation and flight assistance instruments, and in particular the instruments that are intended for aerial navigation, in which the precision constraints on the position and speed are great, and that are autonomous, that is to say they operate without any resource external to aircraft with the exception of the gravitational field and the Earth's magnetic field.

BACKGROUND OF THE INVENTION

The use of inertial navigation control systems in aircraft is very conventional at the present time. These control systems use accelerometers for determining accelerations along axes defined relative to the aircraft, gyroscopes for determining angular rotation velocities relative to axes that are also defined with respect to the aircraft, and optionally other sensors, such as a barometric altimeter. By integrating the gyroscopic measurements, the orientation of the aircraft at a given moment is determined. By integrating the accelerometer measurements, which may be normalized with respect to an earth reference frame external to the aircraft, thanks to knowledge of the orientation of the aircraft, the velocity components of the aircraft in this Earth reference frame are determined. By integrating the velocities, the geographical positions are determined.

However, measurement sensors are imperfect and have intrinsic measurement errors or bias, which may also vary over the course of the navigation—these are then referred to as short-term errors—or which may vary over long periods (over a year or some ten years)—these errors are then referred to as long-term errors. Bias is more problematic when the position calculations made on the basis of sensor measurement results involve integrations. Integration generates a drift in the measured value, which drift progressively increases over the course of time whenever the integrated value is biased at the start. A double integration (acceleration integral in order to give the velocity and then velocity integral to give the position) further increases this drift considerably.

The short-term errors of the sensors are corrected by means of a recalibration, as for example in the patent FR 2 830 320, in which an inertial navigation control system is hybridized with at least one satellite positioning receiver. The correction may also be made thanks to a numerical model using an often "real time" primary measurement of a quantity, the perturbing effect of which on the measurement is known, for example the internal temperature of the sensors.

The long-term errors cannot be reduced by these methods as they are linked to the stability of the sensor over a time of quite long duration, possibly several tens of years. To a first order, the long-term errors are linked to the stability of the bias (or offset) and to the stability of the sensitivity (or scale factor) of the sensor.

One method of reducing the long-term errors of a measurement sensor consists in constructing the measurement sensor from extremely stable components. The stability of the component, or of the material on which the measurement is based, for example a mechanical component, an electrical component or a gas, guarantees stability of the measurement over time. This very natural method may prove to be extremely expensive as it dictates the use of top-of-the-range components.

SUMMARY OF THE INVENTION

The present invention alleviates the drawbacks of the abovementioned solution. The object of said invention is to correct the long-term errors of a measurement sensor solely on the basis of the age of the sensor at the moment of measurement, that is to say on the basis of the time separating the date of manufacture of the sensor from the date of the measurement. This method requires the law governing the degradation of the measurement with the age of the sensor to be known and requires there to be always a clock delivering an absolute time. The latter condition is very restrictive if the invention has to be inserted into already existing aircraft.

For this purpose, one subject of the invention is a method of correcting the effects of aging of a measurement sensor on board a carrier, the sensor delivering measurements the precision of which degrades with the age of the sensor, a law describing the degradation in the measurement precision as a function of the age of the sensor being known, the carrier being equipped with a processing unit for processing the sensor measurements and with a receiver of a satellite positioning system providing absolute time information with a view to reading an astronomical table in order to establish satellite positions and to deliver a measurement of the position of the receiver, characterized in that it comprises the following steps:

the absolute time information is transmitted from the satellite positioning receiver to the processing unit on turning on the processing unit;

the age of the sensor is determined by comparison of the date of manufacture of the sensor and the absolute time information;

corrections to be made to a sensor measurement, based on the age of the sensor and on the degradation law, are determined; and the corrections are applied to the sensor measurement.

Another subject of the invention is a device delivering measurements, comprising a measurement sensor, the sensor delivering to a processing unit measurements the precision of which degrades with the age of the sensor, the processing unit processing the measurements, a receiver of a satellite positioning system providing absolute time information with a view to reading an astronomical table in order to establish satellite positions and delivering a measurement of the position of the receiver, and a means of storing a law describing the degradation in the measurement precision of the sensor as a function of the age of the sensor, characterized in that it includes:

means for transmitting the absolute time information to the processing unit upon turning on the processing unit;

means for determining, upon turning on the processing unit, the age of the sensor based on the manufacturing date of the sensor and on the absolute time information;

means for determining, upon turning on the processing unit, corrections to be made to a sensor measurement on the basis of the age of the sensor and the degradation law; and means for applying the corrections to the sensor measurements.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1:
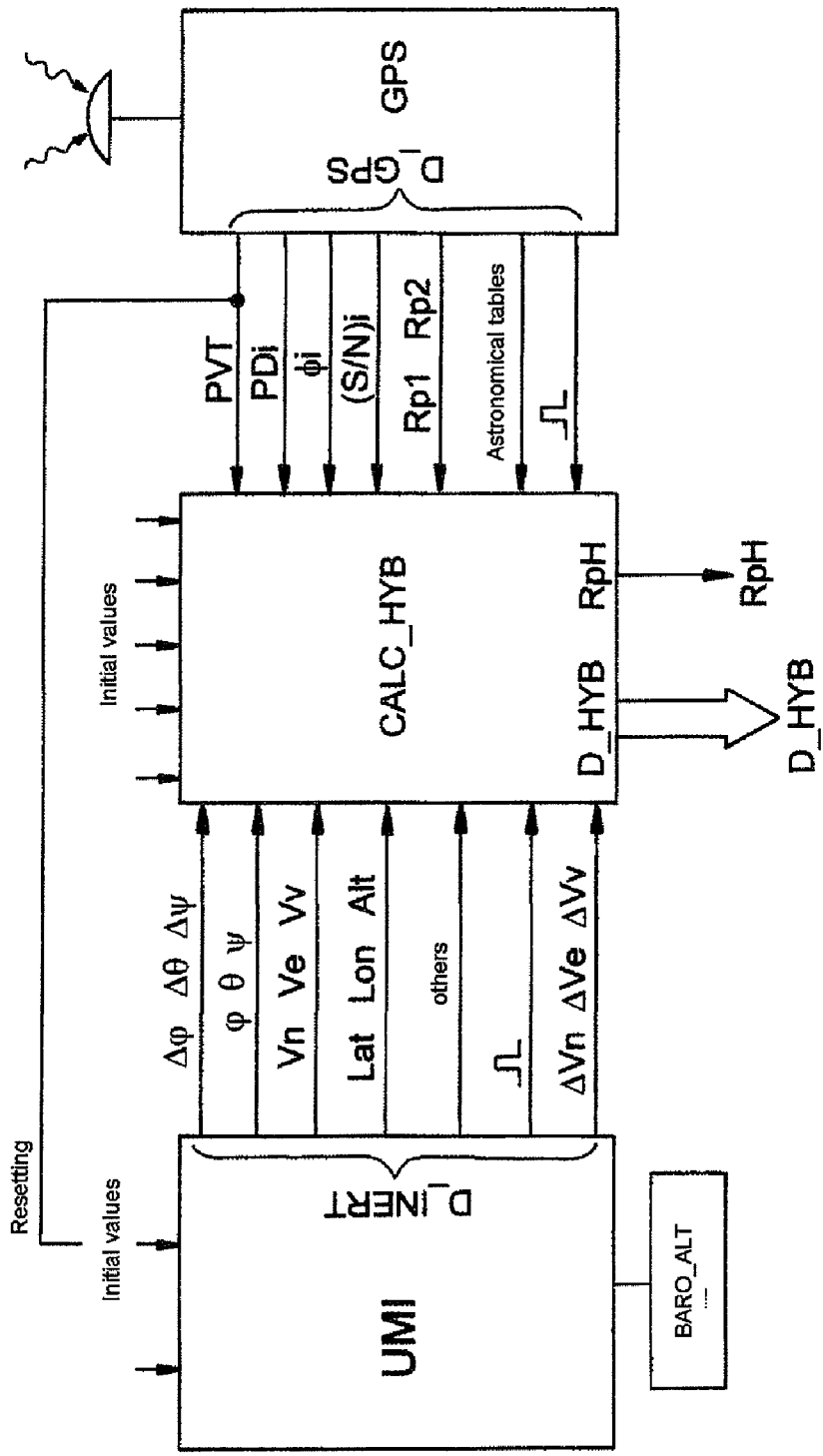
FIG. 1 shows schematically the principle of a hybridized inertial control system with a satellite positioning receiver, constituting the prior art.

To make it easier to read the description, the same references denote the same elements in the various figures.

Compared with the prior art, the invention has a number of advantages, which are explained below:

the effect of the aging of a sensor are corrected thanks to absolute time information coming from a receiver of a satellite positioning system, the operation of which is independent of that of the sensor. This independence is motivated in general by the advantage of maintaining access to the sensor measurements in the event of a failure of the receiver, and conversely maintaining access to position measurements delivered by the receiver in the event of failure of the sensor. Moreover, the likelihood of the absolute time information is examined before it is taken into account for generating the correction. Therefore, the correction of the effects of aging of the sensor does not mean that neither the independence of operation of the sensor and of the receiver, or their individual interchangeability, has to be reviewed. Nor does the correction degrade the operating reliability of the on-board equipment; and the precision of the absolute time information required for correcting the effects of the aging need not be very great—it is unnecessary for this to be shorter than one week. This allows the use of absolute time information coming from an absolute clock of the permanently operating receiver. This absolute time information has the advantage of being available almost instantly, making it possible to generate the correction of the effects of aging of the sensor during an autotest sequence, for example when turning on a processing unit for processing measurements from the sensor. Measurement correction does not require in this case any modification to the software operating during travel of the carrier and in no way degrades its speed of execution. The corrections are taken into account only once, upon turning on the processing unit, and does not affect subsequent real-time calculations.

In what follows, a measurement-delivering device, for example a hybridized inertial control system, is considered. The device comprises an inertial unit UMI that includes at least one sensor, for example an accelerometer or a gyroscope, and a processing unit and a receiver of a satellite positioning system. The processing unit processes measurements delivered by the sensor. The precision of the measurements evolves with the age of the sensor.

A hybridized inertial control system comprises an inertial unit UMI, a satellite positioning receiver, which will hereafter be called a GPS (global positioning system) receiver, referring to the positioning system that is most common, and a hybridization electronic computer COMP_HYB.

The inertial unit UMI is usually composed of:

several, typically three, accelerometers having fixed orientations with respect to the aircraft, delivering values of acceleration along these axes;

several, typically three, gyroscopes, each having a fixed axis with respect to the aircraft and delivering values of angular rotation velocity about these axes; and a processing unit, which is a computer that determines numerical velocity difference data ($\Delta Vn$, $\Delta Ve$, $\Delta Vv$), bearing, roll and pitch attitude difference data ($\Delta\phi$, $\Delta\theta$, $\Delta\psi$), geographical position data (Lat, Lon, Alt), geographic velocity (Vn, Ve, Vv), bearing, roll and pitch attitudes ($\phi$, $\theta$, $\psi$), etc. on the basis of the indications delivered by the accelerometers and gyroscopes. The computer also delivers a time marking pulse defining the instant at which this data is valid and constituting a timebase of the receiver. The numerical data has errors, generated by the aging of the sensors, which are not corrected.

All this data, hereafter called raw inertial data D_INERT, is delivered by the inertial unit UMI to the hybridization computer.

Optionally, other sensors may be associated with the unit UMI, such as a barometric altimeter (BARO-ALT). The computer of the unit UMI then uses the information from this or these additional sensor(s) at the same time as the information from the gyroscopes and accelerometers.

The GPS receiver conventionally delivers a geographical position, in terms of longitude, latitude and altitude, also called resolved position, which also includes an absolute position measurement time or date. The receiver also delivers, in principle, displacement velocities relative to Earth. The combination of this position, this velocity and this absolute time is called PVT point. A time marking pulse defining the instant of validity of the PVT point is also delivered.

The GPS receiver uses for its operation a measurement of the distances between the receiver and each satellite in the view of the receiver. These distances are in fact pseudo-distances $PD_i$ (i denoting a satellite number) obtained in the form of signal propagation times, for propagation between the satellite of rank i and the receiver along the axis (satellite axis) joining the satellite to the receiver. It is the combination of the pseudo-distances along several satellite axes and the knowledge of the positions of the satellites at a given moment that allows the resolved position PVT to be calculated. The positions of the satellites are either inputted into and stored in the receiver or are sent periodically to the receiver in the form of astronomical tables, along with an absolute time by the satellites themselves.

The pseudo-distances $PD_i$ are therefore available in the GPS receiver and are used for the hybridization between the inertial unit and the GPS receiver. Of course, the resolved position information could be used to carry out the hybridization by comparing the GPS resolved position with the calculated position, by integration in the inertial unit, but, as will be seen later, the use of pseudo-distances allows the hybridization to be carried out while taking into account possible faults or breakdowns present on the signal coming from a satellite.

The GPS receiver also generates other data, and notably the astronomical tables representing the position of the satellites at any instant, a single/noise ratio $(S/N)_i$ for each satellite, and one or more protection radius values, namely Rp1 (in horizontal distance) and Rp2 (in vertical distance), which represent a measurement precision.

The GPS receiver delivers to the hybridization computer COMP_HYB all this data, called hereafter D_GPS (GPS data).

The raw inertial data D_INERT and the GPS data are processed in the hybridization computer in order to deliver hybrid inertial data D_HYB, which comprises a hybrid attitude, a hybrid velocity and a hybrid position. The hybridization computer also delivers one or more protection radius values RPH representing the precision of the data resulting from the hybridization. Finally, the computer may deliver data for identifying a faulty satellite and, of course, possibly alarm signals when the protection radius calculation demonstrates insufficient reliability of the information delivered.

The GPS receiver also delivers to the hybridization computer an indication, for each satellite observed, of the phase $\phi_I$ of the carrier of the satellite signal of rank i at the instant of observation.

The hybridization is carried out by Kalman filtering algorithms in order to obtain both the qualities of stability and of absence of short-term noise of the inertial unit and the very high, but very noisy, short-term precision of the GPS receiver. The Kalman filtering makes it possible to take into account the intrinsic short-term behavior errors of the inertial unit UMI and to correct these errors. The measurement error of the inertial unit UMI is determined during the filtering and is added to the measurement delivered by the inertial unit UMI in order to give a hybrid measurement in which the errors due to the behavior of the UMI unit are minimized.

In addition, the construction of the filtering algorithm, using the pseudo-distances coming from the GPS receiver and the phases of the carrier of the satellite signals, is such that it is possible to determine the faulty satellites and to exclude them, and to calculate the protection radii of the hybrid position both in the absence of a fault in a satellite and in the presence of a fault.

The hybridization computer is therefore designed both to correct the short-term errors inherent in the sensors of the inertial unit and to take into account defects in the spatial segment for receiving the satellite signals.

Additional means may also be provided for detecting (but not necessarily correcting) material defects in the inertial unit (non-modeled defects, that is to say breakdowns) and material faults of the GPS receiver. These means consist in practice in providing redundant systems, with another inertial unit, another GPS receiver and another hybridization computer. This type of redundancy is not the subject of the present invention and will not be described, but the invention may be incorporated into redundant systems just as in nonredundant systems.

The hybridization may be carried out in open loop mode, that is to say the inertial unit is not slaved to the data resulting from the hybridization. It may also be carried out in closed loop mode, and in this case the inertial unit is corrected for the (short-term) sensor bias estimated by a filter of the hybridization computer.

In general, it is necessary to input initial values into the inertial unit and into the hybridization computer. These initial values are given the first time with reference to an absolute reference frame. For example, starting with a stationary aircraft on the ground, in a known attitude and a known position, this attitude and this position are input as initial values into the filter. Subsequently, during flight, the measurements delivered by the inertial unit may be corrected from time to time depending on the measurements delivered by the GPS receiver.

Figure 2:
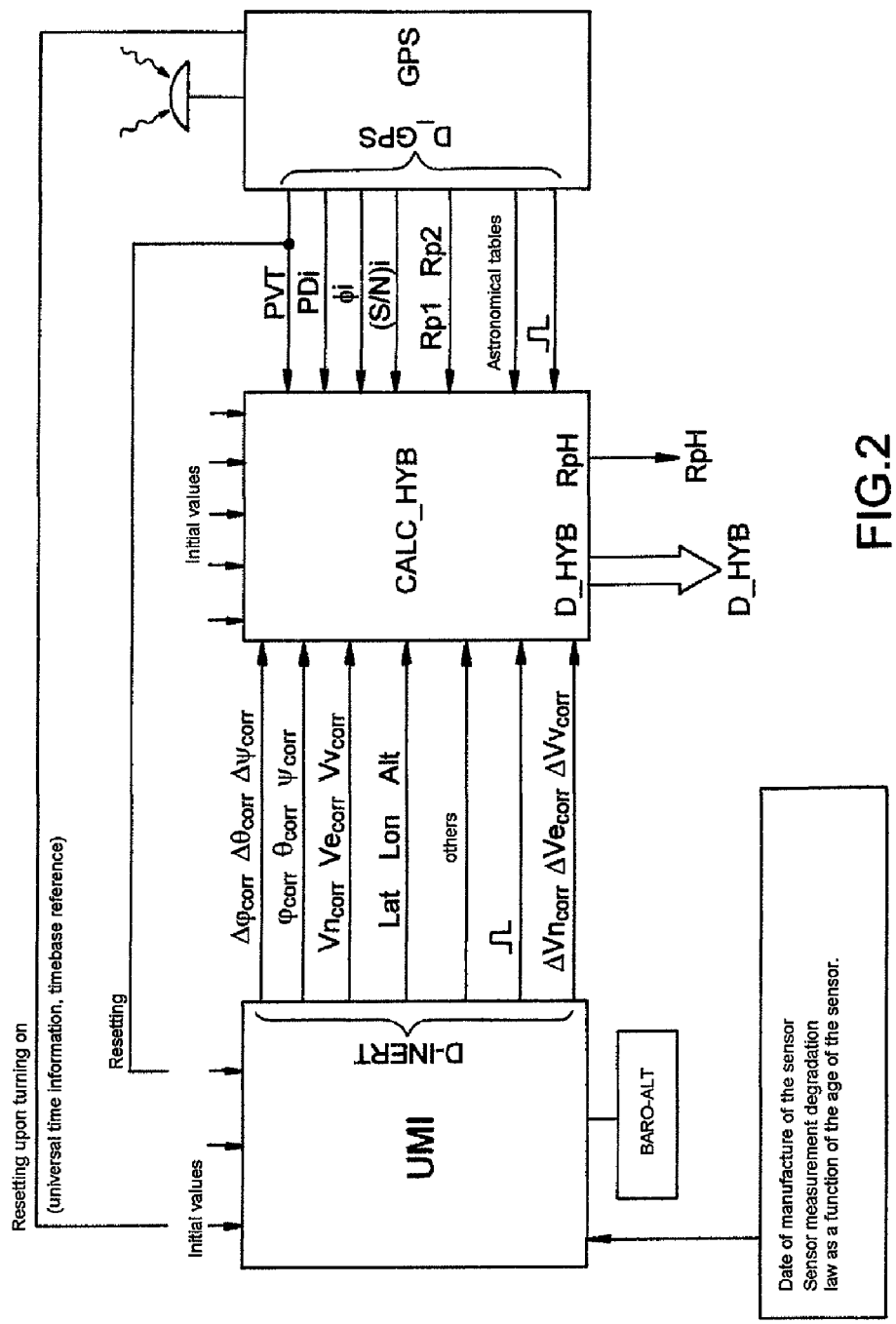
FIG. 2 shows schematically the principle of a hybridized inertial control system with a satellite positioning receiver, comprising a device according to the invention.

FIG. 2 shows an example of the device according to the invention, a hybridized inertial control system delivering a measurement of the components of an acceleration vector.

To ensure a high level of operating reliability, which is an important requirement for the navigation systems and instruments on board aircraft, it may be necessary for the GPS receiver and the inertial unit to operate independently. Advantageously, a failure of the receiver does not entail a failure of the sensor, and conversely a failure of the sensor does not entail a failure of the receiver.

Compared with the prior art shown in FIG. 1, the inertial unit UMI includes a law that describes the degradation in the measurements of a sensor, for example a gyroscope, the date of manufacture of the sensor and means for recovering, on turning on the inertial unit, absolute time information coming from the GPS receiver. The GPS receiver has an absolute clock for preloading satellite astronomical tables and thus rapidly delivering information about the position of the receiver. It is preferentially this absolute time information, rather than that transmitted by the satellites to the GPS receiver, which is transmitted to the processing unit when said unit is turned on, as this is immediately available. The absolute time information is transmitted to the inertial unit UMI by means of a digital channel. The inertial unit UMI uses the absolute time information to determine the age of the sensor. Since the long-term errors evolve relatively slowly over time, the precision of the absolute time information is not critical—the representative time scale is of the order of one week. The absolute time information may be a universal time, also called Greenwich Mean Time, or any other time dating having the property of defining an instant unambiguously and uniquely. In this case, the computer COMP_HYB of the hybridized inertial control system determines numerical data: geographic velocity ($Vn_{Corr}$, $Ve_{Corr}$, $Vv_{Corr}$) and bearing, roll and pitch attitudes ($\phi_{Corr}$, $\theta_{Corr}$, $\psi_{Corr}$), including corrections for the effects of aging of the sensors that were used to measure this data.

Advantageously, the receiver includes an absolute clock and an energy reserve for permanently supplying the clock and the clock may permanently deliver the absolute time information.

According to the prior art, the receiver of the positioning system uses a timebase reference coming from the satellites to measure the pseudo-distances. When a hybridized inertial control system includes a device according to the invention and a timebase for performing a measurement with the device, the hybridized inertial control system may also include means for recovering the timebase reference, which is transmitted to it by the receiver by means of an analog electrical signal representative of a duration between two transitions. The precision of the timebase reference is very high, of the order of a pico-second over a duration of one second. The hybridized inertial control system employs the timebase reference coming from the GPS receiver to recalibrate its own timebase, which is less stable over the long term than that of the GPS receiver, and thus to correct the effects of aging of its timebase.

The absolute time information and the timebase reference information are transmitted to the computer COMP_HYB each time the computer COMP_HYB is turned on.

Once the age of the sensor has been established, the computer COMP_HYB determines corrections for measurements made by a sensor of the inertial unit UMI on the basis of the law of degradation of the sensor measurements. The law of degradation is determined from a collective or individual characterization of the sensor carried out in the factory. For example, for an accelerometer, it may be established that the long-term drift of the sensor follows a law that depends on time and possesses either an exponential form or a linear form, or else a form consisting of a combination of several mathematical functions.

Moreover, the inertial unit includes means for example for verifying that the absolute time information transmitted to it is actually chronologically after absolute time information transmitted to it when turned on previously, or better still is chronologically after the time when it was previously turned off.

Advantageously, the processing unit for processing the sensor measurements includes means for verifying the relevance of the absolute time information upon receiving the information.

Using the timebase reference, the inertial unit UMI calibrates its own timebase and determines time measurement corrections to be applied to all the time measurements or frequency measurements internal to the unit, either directly on the measurements or on the resulting quantity.

The method used for calibrating the timebase of the inertial control system is any known method, for example one in which a number of periods of the timebase is counted over a time interval between two pulses coming from a timebase of a GPS receiver.

Advantageously, when the processing unit includes a timebase for processing the measurements, the receiver provides timebase reference information so as to define an instant of validity of the position measurements, characterized in that it includes the following steps:
  on turning on the processing unit, the timebase reference
    information coming from the receiver is sent to said
    processing unit; and
    the timebase of the processing unit is calibrated on the
      basis of the timebase reference information.
Advantageously, the timebase reference information is of very high precision.

Advantageously, the sensor is an accelerometer.
Advantageously, the sensor is a gyroscope.
Advantageously, the sensor is a barometric altimeter.

Figure 3:
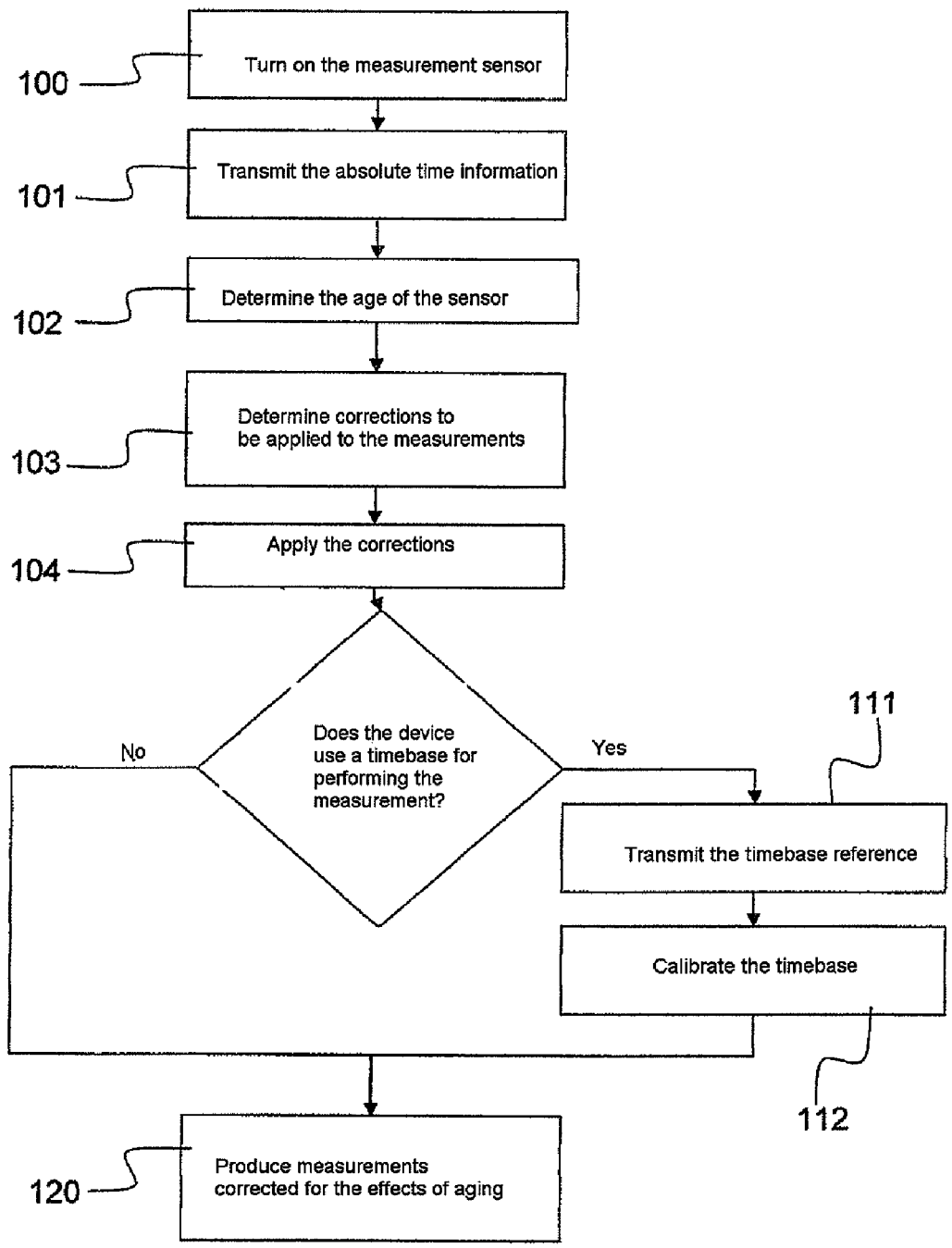
FIG. 3 shows a flowchart for the method of correcting the effects of aging of a device, according to the invention.

A flowchart illustrating the operation of a device, for example an inertial unit UMI, delivering measurements corrected for the effects of its aging and allowing the method according to the invention to be implemented, will now be described. This flowchart is shown in FIG. 3.

The device on board a carrier, for example an aircraft, includes a measurement sensor delivering to a processing unit a measurement that is corrupted by errors generated by the aging of the sensor, the processing unit processing the measurements, and a receiver of a satellite positioning system. The sensor and the receiver are two separate instruments that can be placed at different positions on the carrier and operate independently: a failure of the receiver does not entail a failure of the sensor, and conversely a failure of the sensor does not entail a failure of the receiver.

Advantageously, the receiver includes an absolute clock and an energy reserve for permanently supplying the clock, and the clock permanently delivers absolute time information.

Over the period of time separating the moment when the device is turned on and the moment when the sensor carries out a measurement, a sequence comprising a succession of steps is carried out so as to implement a correction for the effects of aging of the sensor.

A first step 100, that of supplying electrical power to the processing unit and the sensor, is followed by a second step 101 of transmitting absolute time information coming from the receiver to the processing unit.

A third step 102 consists in determining the age of the sensor on the basis of the absolute time and the date of manufacture of the sensor, by comparison of the absolute time information and the date of manufacture of the sensor.

During a fourth step 103, corrections to be made to the sensor measurement are determined according to the age of the sensor and a sensor degradation law. At this stage, during a step 104, the corrections are applied systematically by the processing unit to the measurements delivered by the sensor in order to correct the effects of its aging.

When the device includes an internal timebase for processing the sensor measurements, it may also be advantageous to correct the effects of the aging of the timebase. Two additional steps are needed prior to the measurements, namely a step 111 for recovering precise timebase reference information and a step 112 for calibrating the timebase of the inertial unit on the basis of the precise timebase reference.

Advantageously, the processing unit has a timebase for processing the sensor measurements, and the receiver of the satellite positioning system provides timebase reference information, the device including:
  means for transmitting the timebase reference information
    to the processing unit, upon turning on the processing
    unit; and
  means for calibrating the timebase of the processing unit
    on the basis of the timebase reference.

Advantageously, the receiver includes an absolute clock and an energy reserve which permanently supplies the clock and the clock delivers the timebase reference information.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of correcting the effects of aging of a measurement sensor on board a carrier, the sensor delivering measurements the precision of which degrades with the age of the sensor, a law describing the degradation in the measurement precision as a function of the age of the sensor being known, the carrier being equipped with a processing unit for processing the sensor measurements and with a receiver of a satellite positioning system providing absolute time information with a view to reading an astronomical table in order to establish satellite positions and to deliver a measurement of the position of the receiver, characterized in that it comprises, on turning on the processing unit, the following steps:

transmitting the absolute time information from the satellite positioning receiver to the processing unit;

determining the age of the sensor by comparison of the date of manufacture of the sensor and the absolute time information;

determining corrections to be made to a sensor measurement, based on the age of the sensor and on the degradation law; and applying the corrections to the sensor measurement.

2. The method as claimed in claim 1, wherein a failure of the receiver does not entail a failure of the sensor and conversely in that a failure of the sensor does not entail a failure of the receiver.

3. The method as claimed in claim 2, when the processing unit includes a timebase for processing the measurements, the receiver providing timebase reference information so as to define an instant of validity of the position measurements, characterized in that it includes the following steps:

on turning on the processing unit, the timebase reference information coming from the receiver is sent to said processing unit; and the timebase of the processing unit is calibrated on the basis of the timebase reference information.

4. The method as claimed in claim 1, wherein the receiver includes an absolute clock and an energy reserve for permanently supplying the clock and in that the clock permanently delivers the absolute time information.

5. The method as claimed in claim 1, when the processing unit includes a timebase for processing the measurements, the receiver providing timebase reference information so as to define an instant of validity of the position measurements, characterized in that it includes the following steps:

on turning on the processing unit, the timebase reference information coming from the receiver is sent to said processing unit; and the timebase of the processing unit is calibrated on the basis of the timebase reference information.

6. The correction method as claimed in claim 5, wherein the timebase reference information is of very high precision.

7. The correction method as claimed in claim 6, wherein the receiver includes an absolute clock and an energy reserve for permanently supplying the clock and in that the clock delivers the timebase reference information.

8. The correction method as claimed in claims 5, wherein the receiver includes an absolute clock and an energy reserve for permanently supplying the clock and in that the clock delivers the timebase reference information.

9. The correction method as claimed in claim 1, wherein the relevance of the absolute time information upon receiving the information is verified on receiving the information.

10. A device delivering measurements, comprising a measurement sensor, the sensor delivering to a processing unit measurements the precision of which degrades with the age of the sensor, the processing unit processing the measurements, a receiver of a satellite positioning system providing absolute time information with a view to reading an astronomical table in order to establish satellite positions and delivering a measurement of the position of the receiver, and a means of storing a law describing the degradation in the measurement precision of the sensor as a function of the age of the sensor, characterized in that it includes:

means for transmitting the absolute time information to the processing unit upon turning on the processing unit;

means for determining, upon turning on the processing unit, the age of the sensor based on the manufacturing date of the sensor and on the absolute time information;

means for determining, upon turning on the processing unit, corrections to be made to a sensor measurement on the basis of the age of the sensor and the degradation law; and means for applying the corrections to the sensor measurements.

11. The device as claimed in claim 10, wherein a failure of the receiver does not entail a failure of the sensor and conversely in that a failure of the sensor does not entail a failure of the receiver.

12. The device as claimed in claim 11, wherein the receiver includes an absolute clock and an energy reserve for permanently supplying the clock and in that the clock permanently delivers the absolute time information.

13. The device as claimed in claim 11, the processing unit having a timebase for processing the sensor measurements, the receiver of the satellite positioning system providing timebase reference information, characterized in that it includes:

means for transmitting the timebase reference information to the processing unit, upon turning on the processing unit; and means for calibrating the timebase of the processing unit on the basis of the timebase reference.

14. The device as claimed in claim 10, wherein the receiver includes an absolute clock and an energy reserve for permanently supplying the clock and in that the clock permanently delivers the absolute time information.

15. The device as claimed in claim 10, the processing unit having a timebase for processing the sensor measurements, the receiver of the satellite positioning system providing timebase reference information, characterized in that it includes:

means for transmitting the timebase reference information to the processing unit, upon turning on the processing unit; and means for calibrating the timebase of the processing unit on the basis of the timebase reference.

16. The device as claimed in claim 10, wherein the timebase reference information is delivered by a clock of the receiver.

17. The device as claimed in claim 10, wherein the sensor is a barometric altimeter.

18. The device as claimed in claim 10, wherein the sensor is an accelerometer.

19. The device as claimed in claim 10, wherein the sensor is a gyroscope.

20. The device as claimed in claim 10, wherein the processing unit includes means for verifying the relevance of the absolute time information upon receiving the information.

\* \* \* \* \*